United States Patent Office 3,298,090
Patented Jan. 17, 1967

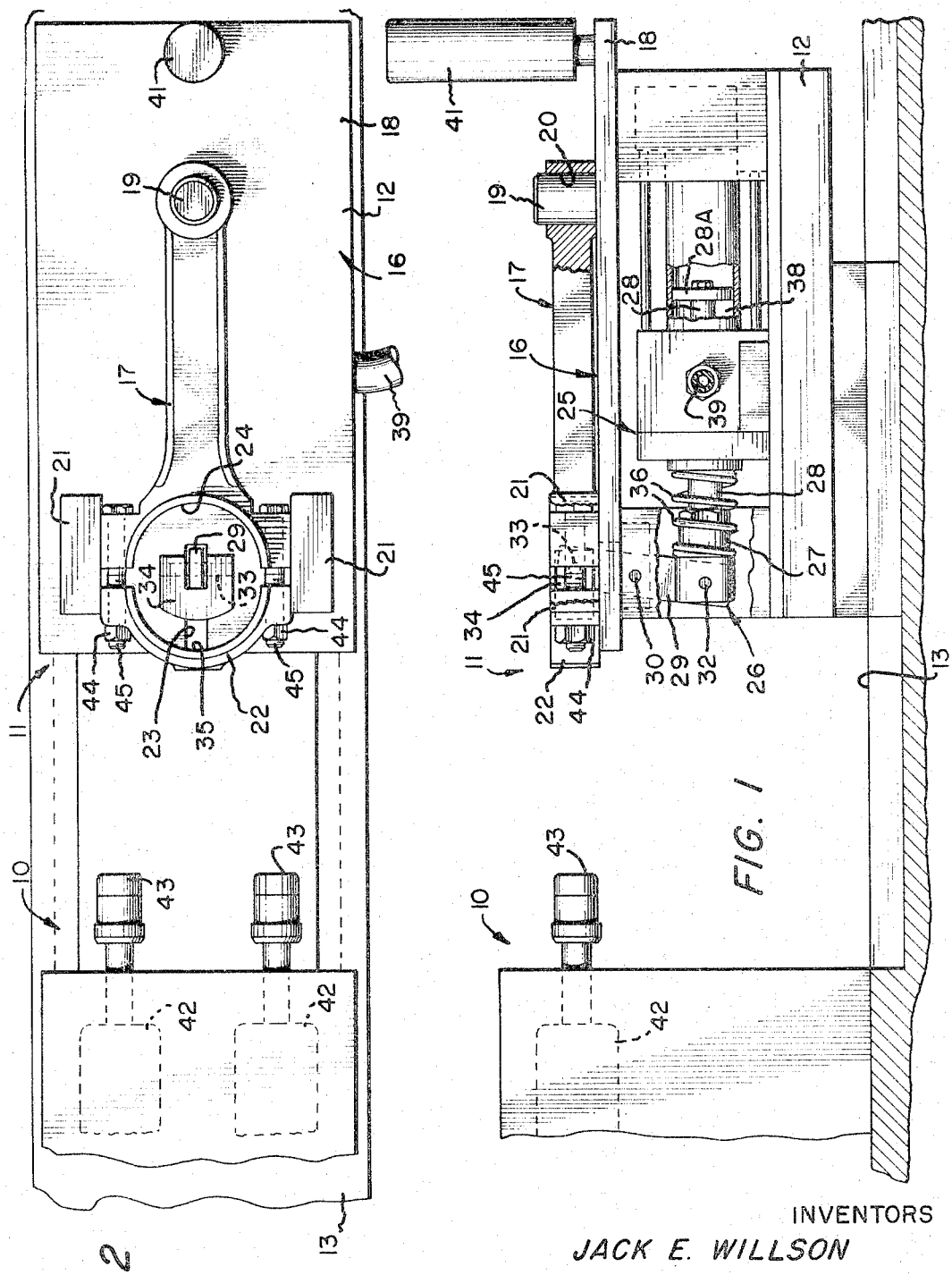

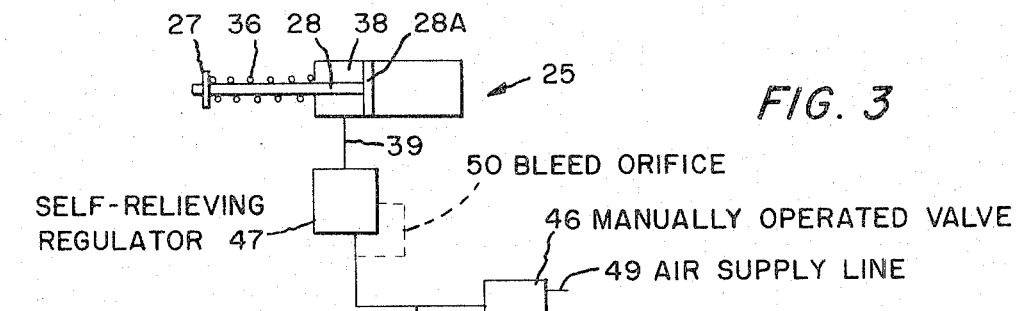
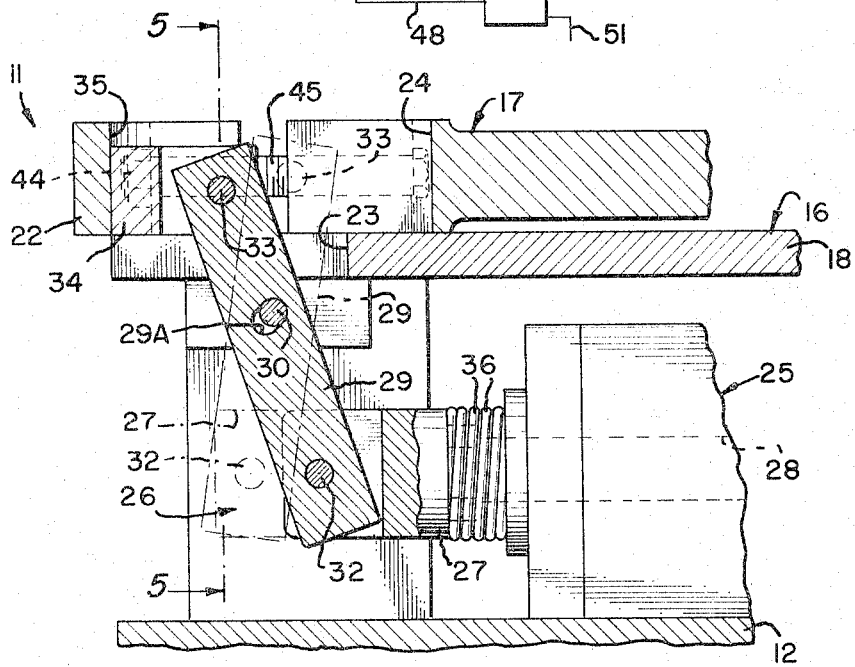
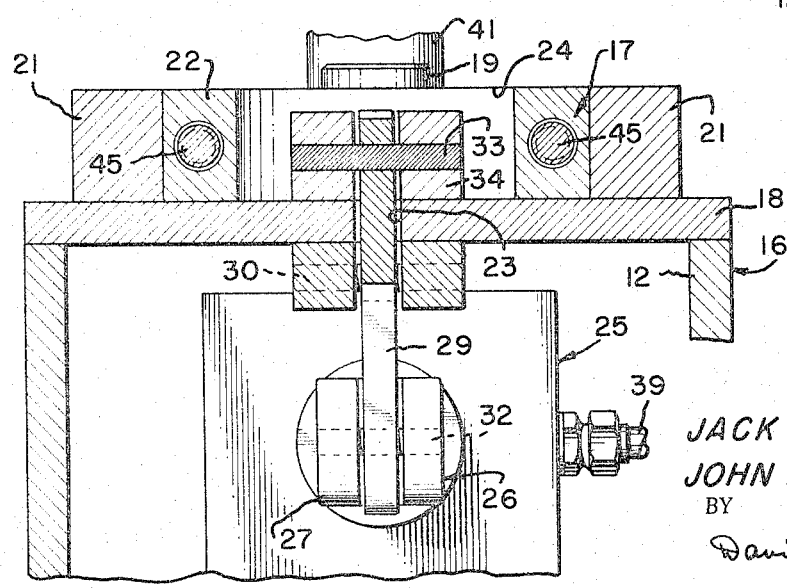

3,298,090
POWER FASTENER DEVICE
Jack E. Willson, Sayre, Pa., and John M. Steadle, Jr., Waverly, N.Y., assignors to Ingersoll-Rand Company, New York, N.Y., a corporation of New Jersey
Filed June 22, 1965, Ser. No. 465,942
5 Claims. (Cl. 29—240)

This invention relates generally to power fastener driving machines and the like and, more particularly, to a work holder for use with a fastener driving machine for tightening fasteners to predetermined torque loads.

In the past, difficulties have been encountered in uniformly tightening fasteners to predetermined torque loads using air powered stall-type fastener driving machines. A stall-type fastener driving machine is driven by an air motor which stalls at the end of a fastener driving cycle. This type of machine initially drives a fastener through a run-down phase of the fastener driving cycle, at high speed, until it is seated, then tightens the fastener until the machine stalls. Hence, the tightening of the fastener is accomplished partly by the inertial energy or kinetic energy created during its run-down phase. Due to small differences between individual fasteners, the inertial energy generated by the machine during run-down will vary; as a result, this variance of inertial energy applied to different fasteners at the end of run-down will cause a variance in the final torque loads applied to different fasteners by the machine, thus making it difficult to tighten fasteners uniformly to a selected torque load. In addition, where a plurality of fasteners are being simultaneously driven, some fasteners may seat earlier than others, causing the final torque loads on different fasteners to vary.

The principal object of this invention is to eliminate the foregoing problems and to provide a work holder for use with a power fastener driving machine which permits threaded fasteners to be uniformly tightened to predetermined torque loads, within a relatively narrow load range.

In general, the objects of this invention are attained by applying a resilient load on the fastener acting in a direction opposing the tightening movement of the fastener during its run-down. This results in the fastener being seated at some time before the start of the tightening of the fastener. Thus, the inertial energy applied to the fastener during its run-down is dissipated prior to the beginning of the tightening of the fastener, resulting in the elimination of inertial effects causing uneven tightening of the fastener.

Accordingly, the present invention contemplates a novel combination of a power fastener driving tool and a work holder for supporting and holding a pair of work pieces to be secured together by the tightening of threaded fasteners, such as nuts, bolts, or the like. The work holder and the fastener driving tool are mounted for movement relative to each other so that the threaded fastener engaging devices, such as sockets and the like, of the fastener driving tool are engageable with and disengageable from the threaded fasteners to be tightened. A fastener loading means is disposed to apply a resilient force to the work pieces acting in a direction counter to the tightening direction of the threaded fasteners, thereby resiliently opposing or resisting the turning force applied to the fasteners during run-down causing the fastener driving tool to slow down before entering the fastener tightening phase of the fastener driving cycle.

The invention is described in connection with the drawings wherein:

FIG. 1 is a side elevational view with parts broken away of a combination multifastener driving machine and assembly device for connecting rods embodying the novel concepts of this invention;

FIG. 2 is a top plan view of the apparatus shown in FIG. 1;

FIG. 3 is a schematic diagram of the fluid control system of the device of FIG. 1;

FIG. 4 is an enlarged fragmentary elevational view with parts broken away and showing alternate positions of the assembly device; and FIG. 5 is a cross-sectional view taken substantially along line 5—5 of FIG. 4.

FIGS. 1 and 2 show a multifastener driving machine 10 containing a fastener loading device 11 embodying the concepts of this invention for cooperating with the fastener driving machine 10 to achieve the objects and purposes of this invention. The multifastener driving machine 10 is shown as an air motor driven, nut running machine of conventional construction well known to those skilled in the art. For the purpose of describing the invention, the nut running machine 10 is shown as applied to the tightening of the nuts on a connecting rod. It is to be understood that it is contemplated that the invention is applicable to the tightening of threaded fasteners of a variety of types for securing together a variety of work pieces.

As shown in FIGS. 1 and 2, the fastener loading device 11 comprises a frame 12 slidably mounted on a base 13, by a dovetail slide, for reciprocating movement toward and away from the nut running machine 10. A work support and holder 16 is mounted on the frame 12 to receive and hold a connecting rod 17. The work holder 16 comprises a base 18 to horizontally support the connecting rod 17. A pin 19 is mounted on the base 18 and is adapted to project into the wrist pin bearing hole 20 at the piston end of the connecting rod 17 to secure the latter against longitudinal movement. The work holder 16 has two spaced, upwardly projecting guides or stops 21 located adjacent the big end of the connecting rod 17 to prevent lateral movement of the connecting rod 17, including the connecting rod cap 22. An opening 23 is provided in the work support and holder 16, beneath the bearing opening 24 located in the big end of the connecting rod 17, adjacent the rod cap 22.

The fastener loading means 11 includes a fluid motor 25 mounted on the frame 12 and a pressure pad linkage assembly 26. The pressure pad linkage assembly 26 consists of a bifurcated collar 27 secured to the outer end of the piston rod 28 of the motor 25. The bifurcated collar 27 receives the lower end of a rocker arm 29 which is pivotally mounted intermediate its ends on a pin 30 secured to the frame 12. The lower end of the arm 29 is pivoted between the bifurcated collar 27 by a pin 32 and its upper end is pivoted by a pin 33 to a bifurcated pressure pad 34. The pressure pad 34 has an arcuate-shaped pressure or bearing face adapted to seat on the curved inner surface 35 of the connecting rod cap 22.

A spring 36 is disposed around the piston rod 28 with one end of the spring bearing against a shoulder formed on the collar 27 and the opposite end bearing against the motor housing to urge the piston rod 28 to the left, as viewed in FIGS. 1 and 4, for retracting the pressure pad 34. To actuate the linkage assembly 26 against the force of the spring 36, fluid pressure, such as air, is delivered to the motor 25 through line 39 connected to the chamber 38 in the motor 25.

As best shown in FIG. 4, arm 29 is provided with a slot 29A through which the pivot pin 30 extends so that the pivot pin 32 is permitted to move linearly with the piston rod 28 as the arm 29 rocks about pin 30.

A handle 41 is attached to the work holder 16 for sliding it relative to the nut running machine 10. The nut running machine 10 is mounted on the base 13 and has two air driven rotary motors 42 for rotating a pair of sockets 43 positioned so that each socket engages a connecting rod nut 44 on the connecting rod bolts 45, when the work holder 16 is moved toward the nut running machine 10.

The system for actuating the fastener loading device is shown in FIG. 3. A line 49 is connected to a source of air pressure through a manually operated valve 46 and a self-relieving regulator 47, both of which are of conventional construction. A line 48 interconnects the self-relieving regulator 47 and valve 46. When the valve 46 is opened to connect the line 48 with the air pressure supply line 49, air pressure is delivered to the chamber 38 of the motor 25 to cause the piston 28A and piston rod 28 to move to the right as viewed in FIGS. 3 and 4. This movement of the piston acts through the linkage assembly 26 to move the pressure pad 34 into abutment against the inner surface of the connecting rod cap 22 and to resiliently urge the cap 22 in a direction counter to the tightening movement of the nuts 44 on the bolts 45, thus offering resistance to the tightening of the nuts.

To prevent the resisting force from rising so high that it prevents the tightening of the nuts 44 on the bolts 45, means is provided for relieving the pressurized fluid in the motor 25 at a predetermined maximum pressure. The self-relieving regulator 47 is provided with a bleed orifice 50 (represented schematically in FIG. 3 as a broken line) and the valve 46 is actuated to communicate line 48 with the atmosphere through vent line 51. The bleed orifice 50 functions to release fluid pressure as the pressure of the fluid in the motor 25 rises beyond a predetermined value which might otherwise occur as the nuts 44 are tightened causing the motor piston to move and compress the fluid in the motor 25.

*Operation*

At the start of an operating cycle of the foregoing apparatus, the connecting rod 17 is placed on the base 18 as shown in FIG. 2 with the connecting rod cap 22 loosely mounted thereon by a pair of bolts 45 and nuts 44 started on the bolts 45. At this time, the pressure pad 34 is located in the big end of the connecting rod 17, as shown in FIG. 2.

The valve 46 is opened to feed air pressure through the regulator valve 47 to the motor 25, causing the motor 25 to move the pressure pad 34 against the connecting rod cap 22 and to urge and move the cap 22 resiliently outwardly from the connecting rod 17 against the bolts 45 and nuts 44. At this time, the cap 22 will be spaced from the connecting rod 17 an amount determined by the length of the bolts 45 an extent that the nuts 44 are threaded on the bolts 45.

After the pressure pad 34 is exerting a loading force on the nuts 44, the work holder 16 is moved on the base 13 by the operator grasping the handle 41 until the sockets 43 engage the nuts 44. The air motors 42 are then operated to turn the nuts 44 on the bolts 45. As the nuts 44 are turned to draw the connecting rod cap 22 toward the connecting rod 17, the fluid pressure in the motor 25 is relieved through the regulator valve 47 to prevent it from rising too high and to maintain a constant resisting force on the nuts 44 during the rundown phase of operation so that the nuts 44 seat at substantially the same time and each of the nuts is tightened to a predetermined torque load. This fastener resisting force negates the inertial effect of the motors 42 on the nuts. After the air motors are stopped or stalled, the operator pulls the work holder 16 away from the sockets 43 and closes the valve 46 to dump the fluid pressure in the fluid motor 25, allowing the spring 36 to retract the pressure pad 34 to its disengaged position so that the connecting rod 17 is free to be lifted from the base 18.

It is believed readily apparent that the present invention provides a fastener loading device in combination with a fastener driving machine which permits fasteners to be uniformly tightened to substantially a predetermined torque load.

Although only one embodiment of the present invention has been shown and described, it is to be understood that the invention is not limited thereto except by the scope of the claims. Various modifications and changes can be made without departing from the scope and spirit of the invention as the same will now be understood by those skilled in the art.

Having described our invention, we claim:

1. In combination with a power driven, fastener-driving machine having a fastener-engaging element for engaging and turning a fastener, a fastener-loading device comprising:
    a work holder for locating and holding a work piece adapted to be connected to a second work piece by a fastener positioned for engagement by said fastener-engaging element;
    fastener-loading means disposed adjacent said work holder for applying a resilient force to said work piece opposing the tightening of said fastener; and
    means for actuating said fastener-loading means into engagement with said work piece to apply a predetermined force to said work piece in a direction counter to the direction in which the fasteners are tightened.

2. In combination with a power driven multifastener-driving machine having a plurality of fastener-engaging elements for engaging and turning fasteners, a fastener-loading device comprising:
    a work holder for locating and holding a work piece adapted to be connected to a second work piece by a plurality of fasteners positioned for engagement by said fastener-engaging elements;
    fastener-loading means disposed adjacent said work holder for applying a resilient force to said work piece opposing the tightening of said fasteners; and
    means for actuating said fastener-loading means into engagement with said work piece to apply a predetermined force to said work piece in a direction counter to the direction in which the fasteners are tightened.

3. In combination with a power driven multifastener-driving machine having a plurality of fastener-engaging elements for engaging and turning fasteners, a fastener-loading device comprising:
    a work support and holder for supporting and holding a first work piece in position to be connected to a second work piece;
    a plurality of fasteners located in said work pieces for engagement by said fastener-engaging elements;
    a pneumatic motor;
    link means pivotally connected to said support and holder;
    a pressure pad pivotally secured to one end of said link means;
    said link means being pivotally connected to said pneumatic motor for pivotal movement about said support and holder means so that said pressure paid is moved into and out of engagement with said first work piece to oppose the tightening of said fasteners; and
    control means for controlling actuation of said pneumatic motor to pivot said pressure pad into engagement with said first work piece to apply a predetermined force on said first work piece in a direction counter to the direction in which the fasteners are moved to attach the work pieces together.

4. The apparatus of claim 3 wherein said control means includes an on-off valve and a self-relieving regulator connected to said valve and said piston-cylinder mechanism to control flow of pneumatic pressure to and from said pneumatic motor.

5. The apparatus of claim 3 wherein biasing means is provided to bias the link means and said pneumatic motor in a direction disengaging said pressure pad from said first work piece.

References Cited by the Examiner
UNITED STATES PATENTS

| | | | |
|---|---|---|---|
| 1,144,974 | 6/1915 | Weaver | 29—240 |
| 2,415,552 | 2/1947 | Broecker | 29—240 |

WILLIAM FELDMAN, *Primary Examiner.*

J. C. PETERS, *Assistant Examiner.*